United States Patent
Itahana et al.

(10) Patent No.: US 9,700,797 B2
(45) Date of Patent: Jul. 11, 2017

(54) ELECTRONIC BOOK GAME APPARATUS

(75) Inventors: Toshiyuki Itahana, Tokyo (JP);
Motomu Toriyama, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 13/420,990

(22) Filed: Mar. 15, 2012

(65) Prior Publication Data
US 2012/0244938 A1 Sep. 27, 2012

(30) Foreign Application Priority Data
Mar. 22, 2011 (JP) ................................ 2011-062148

(51) Int. Cl.
G06F 15/02 (2006.01)
A63F 13/60 (2014.01)
A63F 13/47 (2014.01)
A63F 13/537 (2014.01)
A63F 13/88 (2014.01)

(52) U.S. Cl.
CPC ............. *A63F 13/60* (2014.09); *A63F 13/47* (2014.09); *A63F 13/537* (2014.09); *A63F 13/88* (2014.09); *A63F 2300/6009* (2013.01); *A63F 2300/6036* (2013.01); *A63F 2300/632* (2013.01); *G06F 15/0291* (2013.01)

(58) Field of Classification Search
CPC ....... A63F 2300/6036; A63F 2300/632; G06F 15/025; G06F 17/30; G06F 15/0291; G06F 3/0483
USPC ........................................................ 434/317
See application file for complete search history.

(56) References Cited

U.S. PATENT DOCUMENTS

| 5,417,575 | A  | * | 5/1995  | McTaggart ..................... 434/317 |
| 5,761,485 | A  | * | 6/1998  | Munyan ........................ 715/839 |
| 7,631,013 | B2 |   | 12/2009 | Parsons et al. |
| 2002/0087555 | A1 | * | 7/2002 | Murata ............................ 707/10 |
| 2003/0009491 | A1 |   | 1/2003 | Kanai |
| 2004/0090390 | A1 | * | 5/2004 | Mason et al. .................. 345/1.1 |
| 2004/0111671 | A1 | * | 6/2004 | Lu ..................... G06F 17/30899 715/205 |
| 2005/0193330 | A1 | * | 9/2005 | Peters ................... G06F 17/211 715/230 |

(Continued)

FOREIGN PATENT DOCUMENTS

| JP | 2002-279398 | 9/2002 |
| JP | 2003-015993 | 1/2003 |

(Continued)

OTHER PUBLICATIONS

Office Action from Japan Patent Office (JPO) in Japanese Patent Appl. No. 2015-203888, dated Aug. 23, 2016, together with an English language translation.

*Primary Examiner* — James S McClellan
*Assistant Examiner* — Syvila Weatherford
(74) *Attorney, Agent, or Firm* — Greenblum & Bernstein, P.L.C.

(57) ABSTRACT

An electronic book apparatus displays an event invitation icon along with the contents of a book wherein the event invitation icon represents an event data that includes text files and/or game data files that relate to the contents of a specified part of the contents of the book. When a player selects the event invitation icon while reading the contents of the book, the apparatus presents the text as shown in the text files or executes a game from the game data files.

8 Claims, 7 Drawing Sheets

(56) References Cited

U.S. PATENT DOCUMENTS

2007/0026375 A1* 2/2007 Dewey .......................... 434/350
2008/0168073 A1   7/2008 Siegel et al.
2010/0223648 A1* 9/2010 Tian ............................... 725/88
2012/0204086 A1* 8/2012 Stoner et al. ................. 715/201

FOREIGN PATENT DOCUMENTS

| JP | 2007-158638 | 6/2007 |
| JP | 2010-522935 | 7/2010 |
| WO | 2008/121586 | 10/2008 |

* cited by examiner

FIG.5

| FRAME NUMBER | EVENT KIND | DISPLAY POSITION | PROCEDURE |
|---|---|---|---|
| 12 | A | ○○○○ | TEXT 001 |
| 25 | B | × × × × | MINI GAME 01 |
| 33 | A | △△△△ | TEXT 02 |

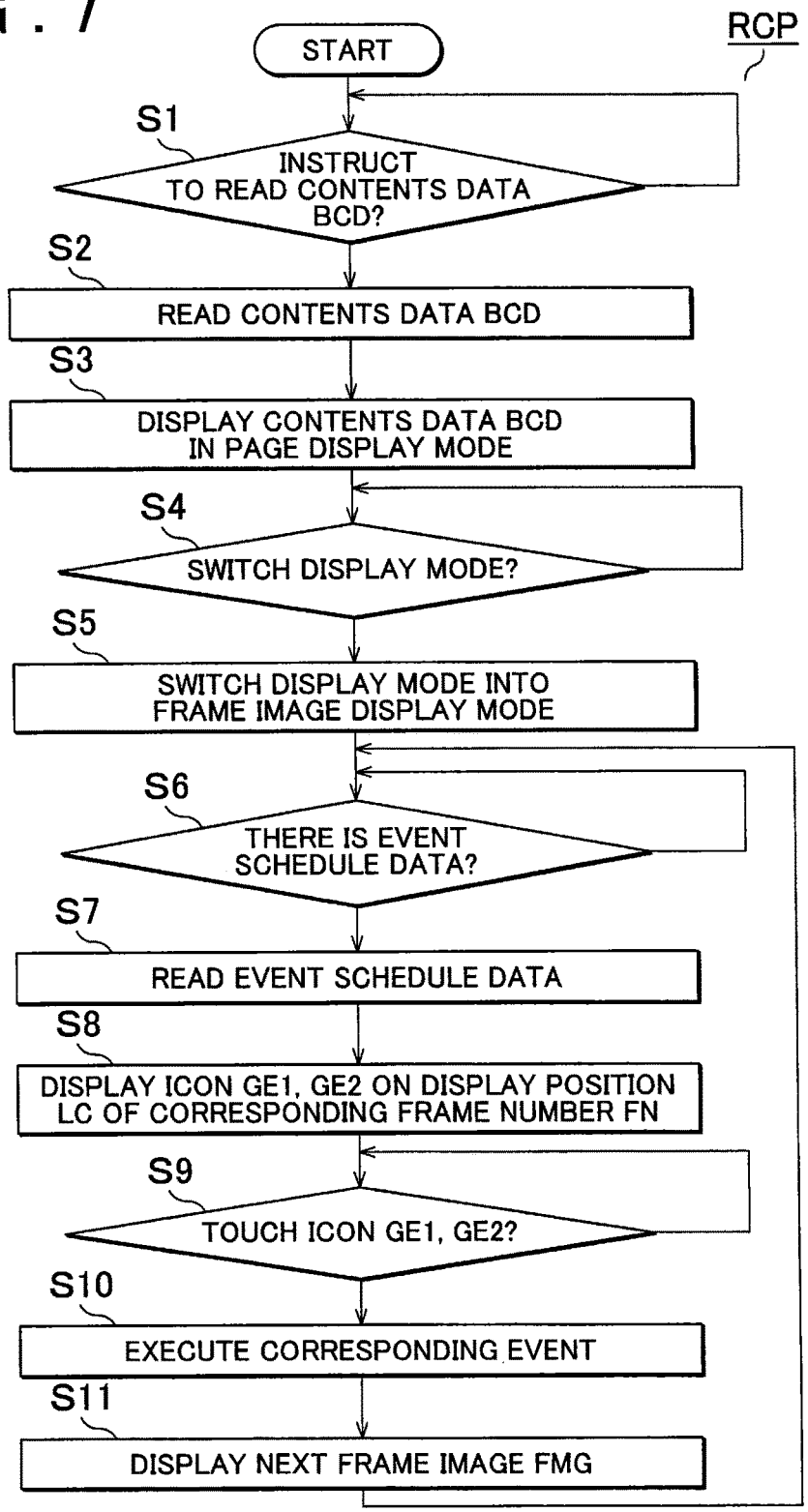

ELECTRONIC BOOK GAME APPARATUS

CROSS REFERENCE TO RELATED APPLICATION

The present disclosure relates to subject matter contained in Japanese patent application No. 2011-62148 filed on Mar. 22, 2011, the disclosure of which is expressly incorporated herein by reference in its entirety.

TECHNICAL FIELD

This invention relates to an electronic book game apparatus for providing players with funs of reading contents of books that are downloaded, such as comic books or novels, and text data or mini games that relates to the contents of the books so as to for player to have funs.

BACKGROUND ART

In such kind of conventional electronic book apparatus, effective sounds are outputted or an image of each frame of a comic book or a balloon showing words is enlarged at the time of displaying the comic book so as to give strong appeals as shown in Patent related document 1 shown below.

PRIOR ART

[Patent related document 1]: Japanese patent application publication No. 2002-279398

Problems to be Solved by Invention

But, a problem in such an apparatus is how to effectively display the contents of the book, such as a comic book and a novel, and such an apparatus does not provide contents excluding ones to be provided by a conventional paper book. Then, it is desirable to develop the electronic book game apparatus that provides new funs using the book contents.

Under such a situation, the object of the invention is to provide electronic book game apparatus that provides players with funs of reading contents of books, such as comic books and novels, and text data that relates to the contents of the books or mini games so as to for player to enjoy.

Means for Solving Problems

A first aspect of the invention is an electronic book game apparatus that stores book contents in a memory as contents data (BCD) and displays said contents data (BCD) on a display (3) in order so as to read said book contents, said book contents formed by electronically converting a book having two or more frame images (FMG, FMG1, FMG2, FMG3) or text data, Wherein said contents data (BCD) includes original contents data (FMG, FMG1, FMG2, FMG3) showing contents of said book together with identification data (FN) for reciprocally identifying said original contents data, and—

Wherein said contents data further includes event data that is comprised of text files (for example, "text 001" file) and/or game data files (for example "mini game 01" file), said event data being associated with corresponding said identification data (FN), said electronic book game apparatus comprising:

an event setting judger (11) further judges whether said event data is set on original contents data (FMG) to be displayed by reviewing said event data at the time of displaying said original contents data corresponding to said identification data on said display (3);

an invitation icon indicator (11) that displays an event invitation icon (GE1, GE2) informing that there is an event that is set on said original contents data on said display (3) together with an image of said original contents data (FMG) so as to be selectable by a player at the time of displaying said original contents data (FMG, FMG1, FMG2, FMG3) to which said event setting judger (11) judged that said event data is set; and an event executor (10, 11) that executes an event that presents a text as shown in said text file or a game stored in said game data file on said display (3), corresponding to said selected event invitation icon in association with a selection signal of said event invitation icon (GE1, GE2) that was inputted through an input means (3a).

A second aspect of the invention is the electronic book game apparatus, wherein said book is a comic book that is comprised of two or more frame images (FMG, FMG1, FMG2, FMG3), said original contents data has said two or more frame images (FMG, FMG1, FMG2, FMG3) to which frame numbers (FN) are respectively assigned as said identification data, and said event invitation icon (GE1, GE2) is set being associated with said specified frame number (FN).

A third aspect of the invention is the electronic book game apparatus, wherein said event executor (10, 11) executes said event that presents said text by displaying such text together with a frame image (FMG, FMG1, FMG2, FMG3) that has been displayed on said display (3), pertinent to the event that presents said text.

A fourth aspect of the invention is the electronic book game apparatus, wherein said event executor (10, 11) interrupts displaying of the frame image (FMG, FMG1, FMG2, FMG3) pertinent to execution of said game that has been displayed on said display and executes said game.

Effects of Invention

According to the invention, the original contents data showing contents of a book (FMG, FMG1, FMG2, FMG3) and the event data that is comprised of the text file (for example, "text 001" file) or the game data file (for example, "mini game 01" file), relating to the original contents data are stored as the contents data of the book (BCD), and the event executor (10, 11) controls to execute the event that presents the text shown in the text file corresponding to the selected event invitation icon or the game stored in the game data file on the display (3) in association of the selection signal of the event invitation icon (GE1, GE2) inputted through the input means (3a), so that the player is possible to have funs of reading contents of books downloaded, such as the comic books and novels, and enjoy the text data relating to the contents of the book or the game.

At the time of execution of the event, the invitation icon indicator (11) displays the event invitation icon (GE1, GE2) informing that there is the event set on the original contents data on the display (3) together with the image (FMG) of the original contents data so as to be selectable by a player, so that it is within player's discretion to enjoy the event in addition to the contents of the book itself, and it is possible to respond to needs of the player without damaging funs of reading the contents of the original book.

The number in parentheses shows the corresponding element in the drawings for the sake of convenience, accordingly, the descriptions are not restricted and bound by the descriptions on the drawings.

BRIEF DESCRIPTION OF DRAWINGS

FIG. 5 is a typical view that shows an example of an event schedule table.

FIG. 7 is a flowchart that shows an example of reading control program.

PREFERRED EMBODIMENT

An embodiment of the invention is now explained, referring to appended drawings.

Figure 2:
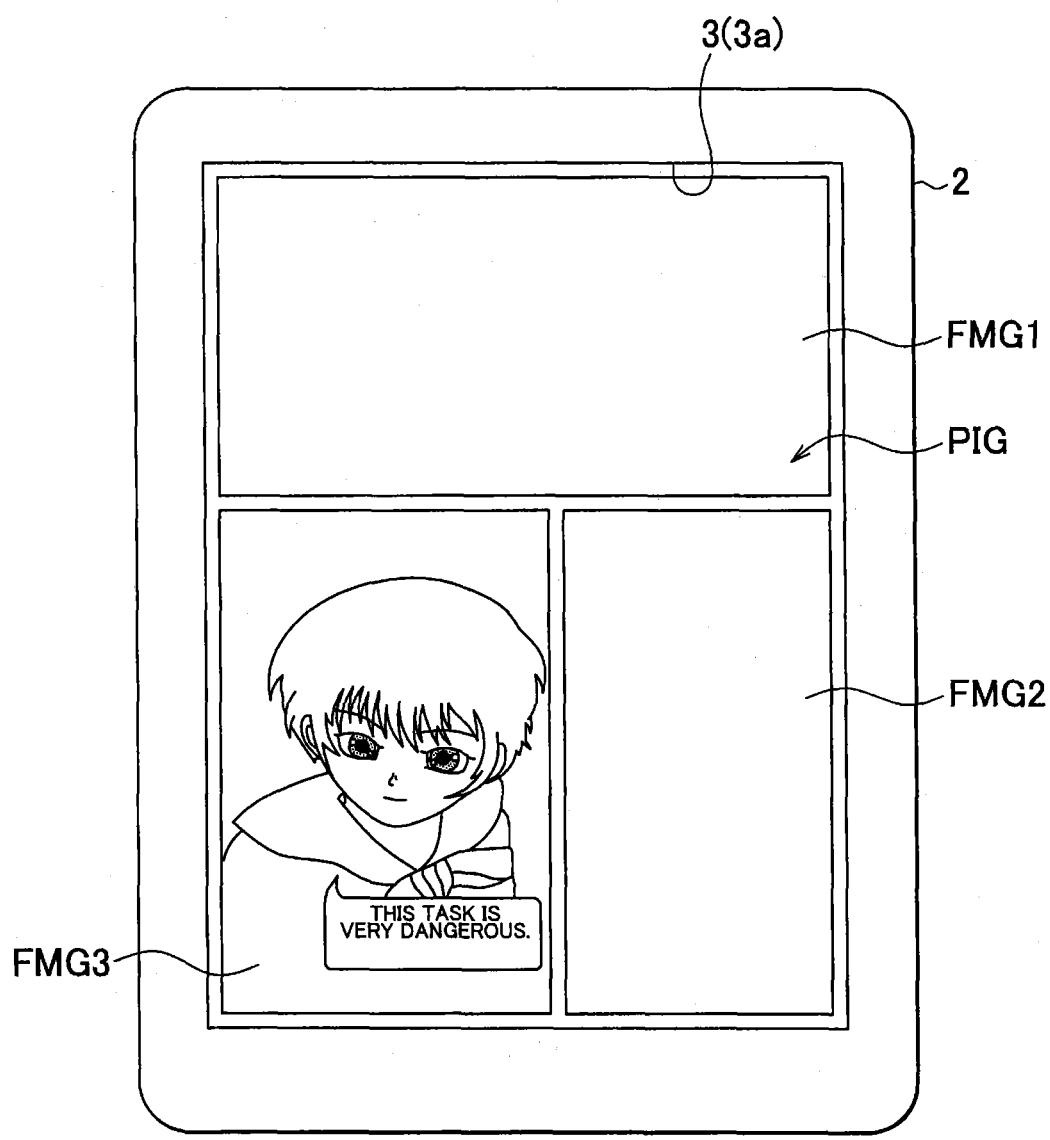
FIG. 2 is a view that shows appearances of one page of a comic book displayed on the electronic book game apparatus to which the invention is applied.

FIG. 2 shows an electronic book game apparatus 1 comprising a computer. The electronic book game apparatus 1 has a main body 2 that is portable by a player and formed in a thin plate shape, and the main body 2 is provided with a liquid crystal display 3. The display 3 also serves as an input means, a touch panel 3a. On the display 3, proper input icons, such as keyboard icons, can be displayed through an input display controller (not shown) provided in the main body 2, and players can do various kinds of operations, such as downloading of book data, switching of screens and switching of pages of a book, when touching the input icons shown on the display 3. Such operations are well known and their detailed explanation is not mentioned.

Figure 1:
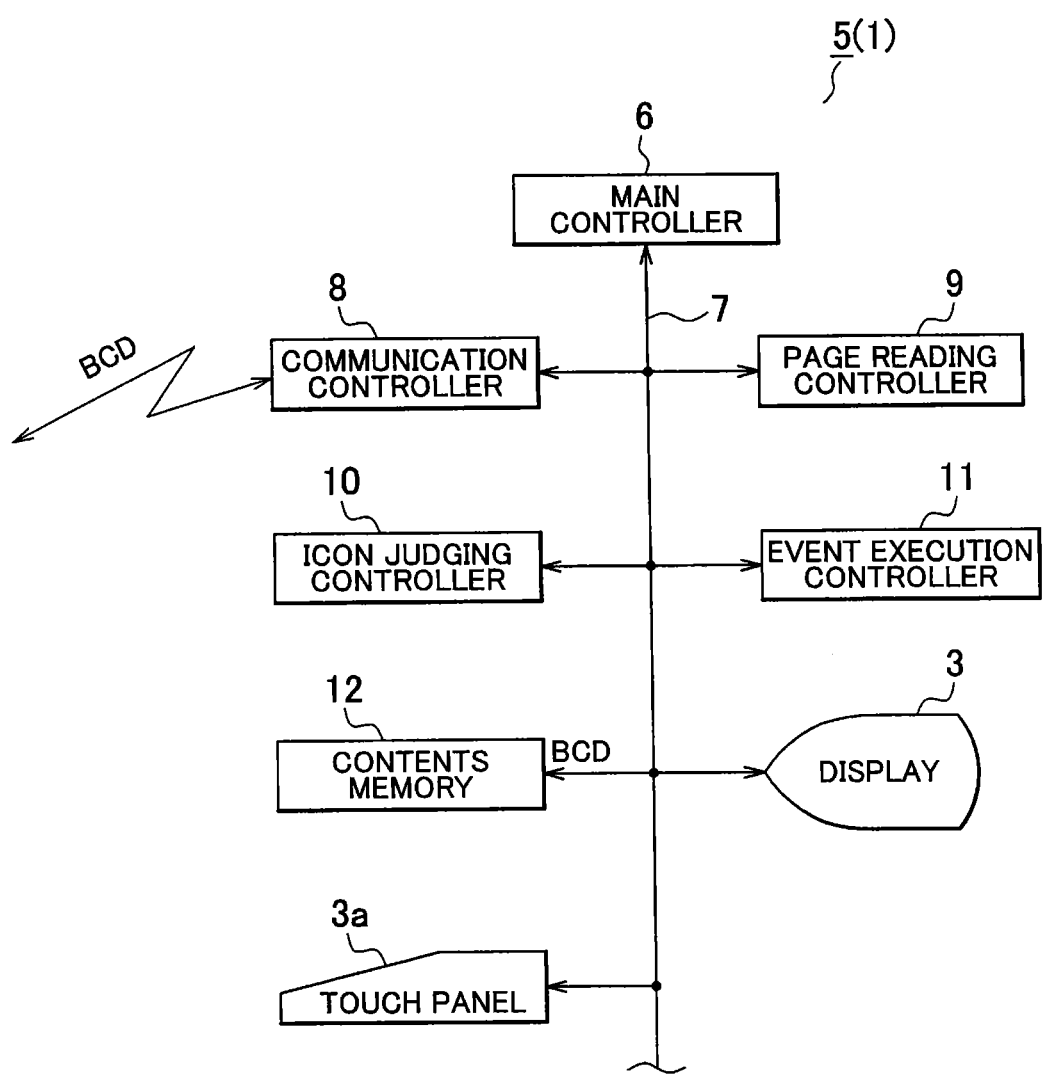
FIG. 1 is a control block diagram of an electronic book game apparatus to which the invention is applied.

FIG. 1 shows a structure of a controller 5 provided in the main body 2 of the electronic book game apparatus 1. The controller 5 has a main controller 6, and a communication controller 8 connected with a public communication line, such as the Internet, a page reading controller 9, an icon judging controller 10, an event execution controller 11, a contents memory 12, the before-mentioned display 3 and the touch panel 3a are connected with the main controller 6 via a bus line 7. FIG. 1 exemplarily shows only portions pertinent to the invention, but does not show the whole structure of an actual electronic book game apparatus 1.

The electronic book game apparatus 1 as shown in FIG. 1 executes functions shown in respective blocks as shown in FIG. 1 in such a manner that a computer reads and executes control program stored in a memory (not shown), such as a program memory so that a CPU or a memory time-dividedly operates by multitask. But, it is also possible to structure the electronic book game apparatus 1 by hardwares corresponding to the respective blocks. Otherwise, it is also possible to control each block by a CPU or a MPU dispersedly provided in each block.

In the electronic book game apparatus 1 having the above-mentioned structure, a player firstly instructs the main controller 6 to read book contents data BCD stored in the contents memory 12 and to display the read data on the display 3 through an operation of a proper icon displayed on the touch panel 3a. The contents memory 12 stores one or more books of contents data BCD downloaded from a book contents server (not shown) via the public communication line and the communication controller 8, and the player instructs to read the contents data BCD of the book that he (or she) wishes to read out of the contents data BCD of two ore more books stored in the contents memory 12 through the touch panel 3a.

At the time of turning on the power of the electronic book game apparatus 1, the main controller 6 reads a reading control program RCP out of a system program memory (not shown) and controls the reading of the contents data BCD by the player according to the reading control program RCP that was read out. When the player inputs the instruction of reading the contents data BCD stored in the contents memory 12 through the touch panel 3a, the reading control program RCP enters Step S2 from Step S1 and instructs the page reading controller 9 to read the corresponding contents data BCD out of the contents memory 12 and to display the read data on the display 3. Receiving such an instruction, the page reading controller 9 reads the contents data BCD stored in the contents memory that was instructed to be read, and displays an electronic book on the display 3 as shown in FIG. 2. In a case of the embodiment, a comic book is displayed on the display 3 in the shape of a page image PIG that is a page unit image of the comic book in paper medium, that is, in a page display mode (Step S3 of FIG. 7). The page image PIG as shown in FIG. 2 is comprised of three frame images FMG 1, FMG2 and FMG3 as original contents data mentioned hereinafter, but number of the frame images FIG per page of the page image PIG is optional. In case of FIG. 2, a concrete comic book image is shown only on the frame image FIG. 3 and no comic book image is shown on the frame images FMG1 and FMG2. But, this is a problem on a drawing preparation, and some concrete comic book images are actually shown thereon as original contents of the book.

It is possible to display the contents data BCD in order in such a manner that a finger of the player is moved on the touch panel 3a in a proper direction so as to output a page switching signal, and the page reading controller 9 turns over or returns the page images PIG per page based upon the page switching signal. In such a state, the player is possible to read the comic book images displayed on the display 3 one by one.

The electronic book game apparatus 1 has a frame image display mode wherein the frame images FMG are displayed on the display 3 in order as well as the page display mode wherein the book is displayed per page. The player can display an icon for selecting the display form (not shown) on the touch panel 3a (the display 3) through the page reading controller 9 at a proper point of time, and instruct the main controller 6 to switch the display mode from the page display mode to the frame image display mode through touching of the icon. When such an instruction is inputted, the main controller 6 enters Step S4 and Step S5 of the reading control program RCP, and switches the display form of the contents data BCD from the page display mode per page into the frame image display mode per frame image FMG through the page reading controller 9.

Figure 3:
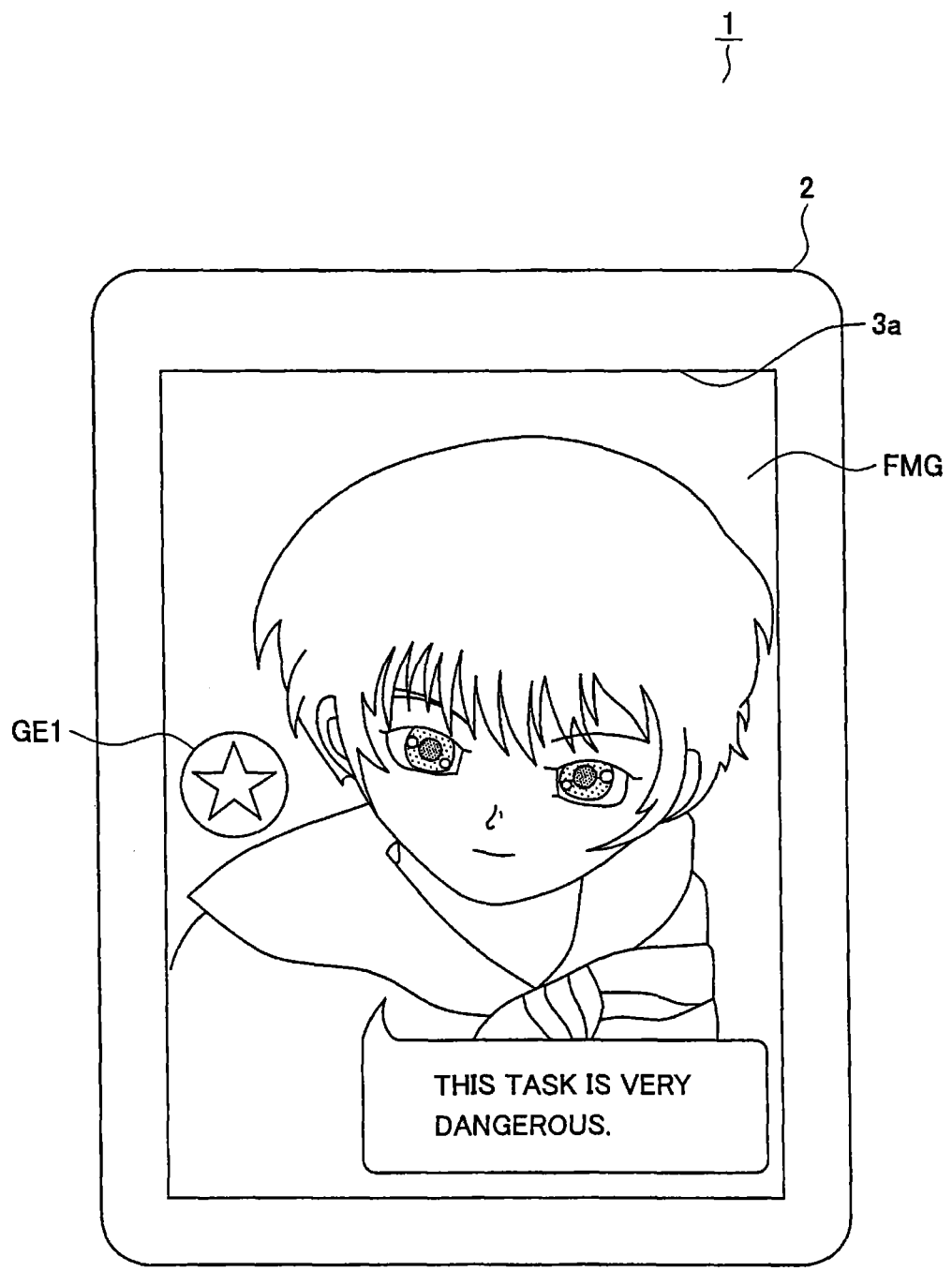
FIG. 3 is a view of one frame of the comic book enlargedly displayed on the electronic book game apparatus to which the invention is applied.

As shown in FIG. 3, in the frame image display mode each frame image FMG comprising the comic book is continuously displayed on the whole screen of the display 3 in the comic book reading orders. In such a frame image display mode, it is possible to display data pertinent to the frame image FMG by text data and for player to select a mini game pertinent to the frame image FMG.

When the display mode enters the frame image display mode in Step S5 of the reading control program RCP, the reading control program RCP enters Step S6 and the main controller 6 reviews whether event schedule data that relates to the comic book (book) is set in the contents data BCD as attribution data. If the event schedule data is set in the shape of a table or a program, the reading control program RCP enters Step S7, and the main controller 6 instructs the event execution controller 11 to read the event schedule data out of the contents memory 12.

The event schedule data is stored so as to be searched every frame number FN in the shape of an event schedule table IST, as shown in FIG. 5, for example. The event schedule table IST is comprised of frame numbers FN that show identification numbers of the frames of the comic book wherein the events are to be executed (generally, numbers are assigned to frames in order starting from a first one of the comic book), event kinds EK showing that the event is a text presentation event for showing the text data to the player or a game event for getting the player to play a mini game, display positions LC that show display coordinate positions of the icon on the display 3, and procedures PS that show concrete procedures. That is, the frame number FN of the frame of the comic book wherein the event is to be executed stores the event kind EK of the event to be executed in the frame number FN, the display position LC that shows the display coordinate position of the icon on the display 3 and the procedure PS that shows the concrete procedure.

In a case of FIG. 5, for example, the event is set in the frame of the frame number FN "12", and in such an event, the event kind EK is "A", that is, the text presentation event for presenting the text data to the player, and the display position LC of the icon on the display 3 for informing the player that there is the text presentation event is shown by the coordinate "○○○○○" and a file name of storing the text data of the text to be displayed in the event "text 001" is set as the procedure PS. Similarly, the event is set in the frame of the frame number FN "25", and in such an event, the event kind EK is "B", and is the game event for getting the player to play the mini game, and the display position LC of the icon on the display 3 that informs the player that there is a game event is shown by the coordinate "××××", and the file name of storing the game data of the mini game to be executed in the event "mini game 01" is set as the procedure PS. The frame number FN "33" is similar.

Figure 6:
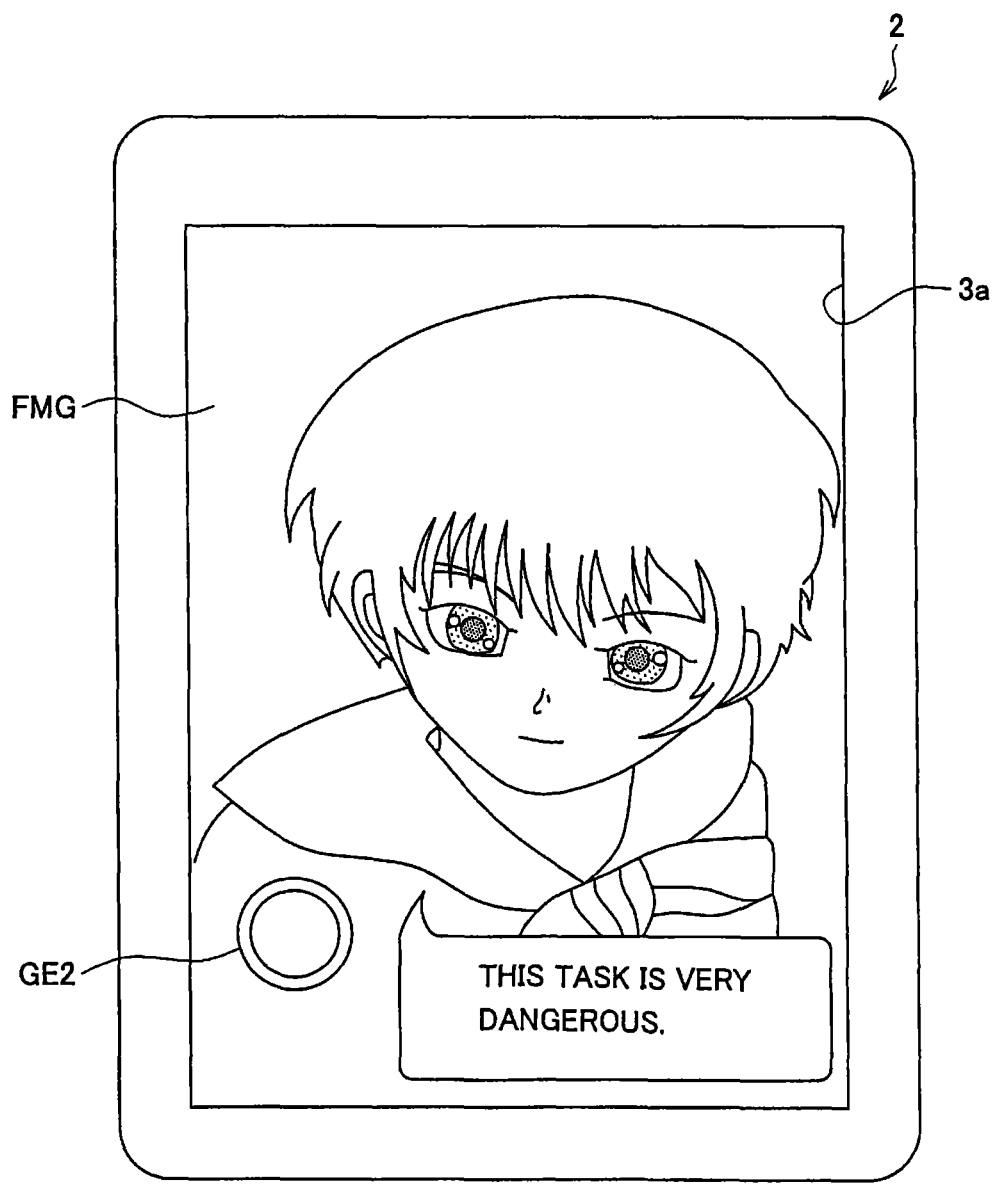
FIG. 6 is a view that shows one frame of the comic book enlargedly displayed on the electronic book game apparatus to which the invention is applied.

Whenever the page reading controller 9 changes the frame of the comic book displayed on the display 3, the event execution controller 11 searches the event schedule table IST so as to judge whether or not some event schedule data is set on the frame number FN presently displayed on the display 3 through a search of the frame number FN stored in the event schedule table IST. In a case where the frame number FN presently displayed on the display 3 is stored in the event schedule table IST, it is judged that some event is set on the frame number FN, and the event schedule data of the frame number FN is read out of the event schedule table IST and a predetermined procedure is done. That is, the event execution controller 11 reads out the display position LC of the icon stored so as to correspond to the frame number FN presently displayed on the display 3 of the event schedule table IST and displays an event icon GE1 or GE2, both are different from each other in these designs, that corresponds to the event kind EK on the display position LC of the icon on the display 3 as shown in FIG. 3 or FIG. 6. The icon GE1 as shown in FIG. 3 shows that the event set on the frame image FMG of the frame number FN is the text presentation event, and the icon GE2 as shown in FIG. 6 shows that the event set on the frame number FMG of the frame number FN is the game event. Then, the player is possible to know the event kind set on the frame image FMG in advance by referring to the icon GE1, GE2 displayed on the display 3 without actually executing the event.

The player perceives that some event is set on the frame image FMG by watching the displayed icon GE1, GE2. If the player has no interest on the execution of the event, he (or she) does a normal page feeding operation on the touch panel (display 3) 3a. Then, the frame image FMG displayed through the page reading controller 9 is switched into the frame image FMG of the next frame number FN, and the player is possible to continue to read the comic book similar to the comic book of a normal electronic book.

During displaying of the icon GE1 or GE2 on the display 3, the icon judging controller 10 detects whether or not the player touches the icon GE1 or GE2 that is displayed on the display 3 through the main controller 6 in Step S9 of the reading control program RCP. If the player touches the icon GE1 or GE2, a predetermined selection signal is outputted to the icon judging controller 10 from the touch panel 3a, and the icon judging controller 10 judges that the player selected the icon GE1 or GE2 when the player touches the icon GE1 or GE2. In such a case, the reading control program RCP enters Step S10 and main controller 6 instructs the event execution controller 11 to execute the procedure PS set on the corresponding frame number FN of the event schedule table IST.

Figure 4:
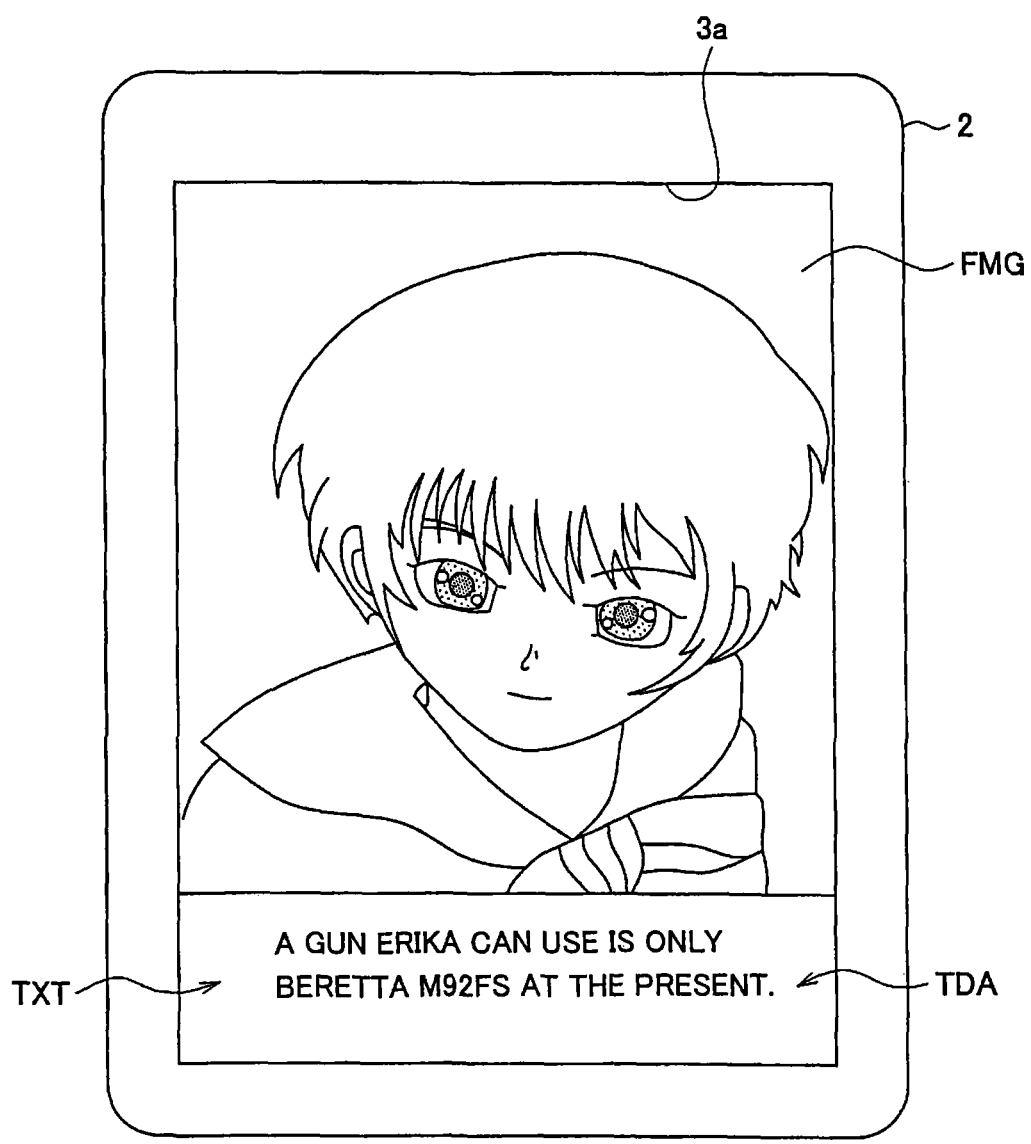
FIG. 4 is another view of one frame of the comic book enlargedly displayed on the electronic book game apparatus to which the invention is applied.

In a case where the text presentation event was set in the procedure PS set on the corresponding frame number FN, the text file shown in the procedure PS (such as "text 001" file) is read out of the contents memory 12, and a text display area TDA is set on a proper area of the frame image FMG presently displayed as shown in FIG. 4, for example, so as to display a text TXT stored in the text file "A gun Erika can use is only Beretta M92FS at the present.". Then, the player reads the text TXT as information pertinent to the frame image FMG presently displayed and is possible to obtain more deeper understanding on the comic book and funs thereof.

In a case where the game event is set in the procedure PS set on the corresponding frame number FN, the event execution controller 11 reads the file of the game data shown in the procedure PS (such as "mini game 01" file) out of the contents memory 12, and interrupts the displaying of the frame image FMG that has been displayed on the display 3 and gets the player to play the read mini game. Detailed explanation of a method of executing the mini game is not mentioned since various kinds of execution methods can be taken but these are already well known.

After the player played the text presentation event or the game event, the main controller 6 enters Step S11 of the reading control program RCP based upon an event execution finish signal outputted from the event execution controller 11 or a paging switching signal inputted by the player, and the page reading controller 9 switches the frame image FMG that has been displayed into the frame image FMG to be displayed next so as to proceed with displaying of the comic book contents. In such a case, it is also possible to properly select the frame image FMG to be displayed next in Step S11 from two or more frame images FMG according to a play result of the event played by the player (including referring to the text in the text presentation event by the player) according to the reading control program RCP and to display the selected.

It is possible to display images as book contents on the display 3 in the electronic book game apparatus 1 by various kinds of methods according to selections by the player or according to control contents of the reading control program RCP, such as a case where one or more frame images FMG of the frames are simultaneously displayed on the display 3 as shown in FIG. 2 and a case where only one frame image FIG is displayed on the display 3 as shown in FIGS. 3, 4 and 6. The book contents include original contents data, such as all sentence contents and image contents obtained by electronically changing contents of normal books comprised of text data, such as novels, kids books, essays, and reviews for the purpose of transferring a paper medium into an electronic display medium, such as a display, as well as the comic books or picture books that are comprised of two or more frame images FMG. The text data that relate to the contents of a specified part of such original contents data and mini game data are set as event data in the contents data BCD of the electronic book to be used in the invention so as to selectively relate to identification data for identifying the original contents data by using such identification data, such as the frame number FN and page number, in addition to such original contents data of the book. For this reason, it is possible for the player to continue to read only original contents data of the original book so as to finish reading the electronic book or to experience wider funs and to get deeper knowledge through reading the text data or playing the mini games that are displayed according to event invitation icons, such as an icon GE1 and GE2, additionally displayed on an image shown on some display page.

It is also possible to freely display the event invitation icons, such as the icons GE1 and GE2, displayed on the specified page of the original contents of the book at the time of moving from the original contents of the book to the event execution. For example, it is also possible to increase number of frame images FMG displayed on the display 3 and to display the event invitation icon on the specified frame image FMG in such a state that two or more frame images FIG are displayed.

The invention claimed is:

1. An electronic book game apparatus, comprising:
a processor;
a memory that stores book contents as contents data; and
a display having a screen configured to display the contents data and also function as a touch panel,
wherein the book contents are formed by electronically converting contents of one or more paper medium books having at least one of plural frame images and text data,
the contents data includes original contents data that represents the contents of the one or more paper medium books,
the original contents data is obtained by electronically changing the contents of the one or more paper medium books into a format configured to be displayed on the display, so that the contents of the one or more paper medium books are displayed as is,
the contents data further includes:
event data that is comprised of at least one of text files and game data files that relate to one or more events corresponding to contents of one or more specified parts of the original contents data, the one or more events being one of a text presentation event and a game event, the event data not being part of the original contents data; and
an event schedule table that comprises a list of the one or more specified parts and a list of the one or more events corresponding to the one or more specified parts,
the display displays the original contents data in a sequence on the screen according to the book contents, based upon page switching signals that are inputted from the touch panel allowing a player to read the book contents as presented by the original contents data,
the processor determines whether the one or more specified parts listed in the event schedule table is displayed on the screen,
the display displays an event invitation icon on the screen together with an image of the one or more specified parts when the processor determines that the one or more specified parts listed in the event schedule table is displayed on the screen, thus informing the player that there is an event of the one or more events that is selectable by the player, the event invitation icon being displayed to not alter the original contents data, the original contents data being readable on the screen while the event invitation icon is displayed,
the processor, when the event invitation icon is selected, causes at least one of presentation of a text file and execution of a game data file corresponding to the selected event invitation icon,
the one or more paper medium books includes a comic book that is comprised of the plural frame images, the original contents data including the plural frame images and frame numbers assigned to each of the plural frame images as identification data, the one of the text file and the game data file corresponding to the selected event invitation icon being associated with a corresponding frame number in the event schedule table, a procedure for at least one of presenting the text file and executing the game data file corresponding to the selected event invitation icon being set on the corresponding frame number in the event schedule table.

2. The electronic book game apparatus according to claim 1, wherein, when the selected event invitation icon corresponds to the game data file, the processor interrupts displaying of a frame image displayed on the display and executes the game data file.

3. The electronic book game apparatus according to claim 1, wherein the one or more events is one of one or more text presentation events corresponding to the text files and one or more game events corresponding to the game data files.

4. The electronic book game apparatus according to claim 1,
wherein the display is configured to display an icon allowing the player to select between a page display mode and a frame image display mode, and
the page display mode displays a book one page at a time and the frame image display mode displays a book one frame image at a time.

5. The electronic book game apparatus according to claim 4, wherein the original contents data has a page image that is a page unit image of the comic book, the page image having one or more of the plural frame images.

6. The electronic book game apparatus according to claim 1, wherein the display is configured to differently display the event invitation icon depending on whether the event is the text file or the game data file.

7. The electronic book game apparatus according to claim 1, wherein the original contents data has a page image that is a page unit image of the comic book, the page image having one or more of the plural frame images.

8. The electronic book game apparatus according to claim 1, wherein the display displays a next frame image from among two or more of the plural frame images in the sequence according to a play result of the event corresponding to the selected event invitation icon.

* * * * *